United States Patent [19]

Bellah et al.

[11] 4,421,215
[45] Dec. 20, 1983

[54] PARK LOCK INTERLOCK CONTROL SYSTEM

[75] Inventors: Glen R. Bellah, Bolingbrook; Lawrence M. Sobol, Hinsdale; Lloyd B. Idelman, Evanston; Vo V. Thanh, Willowbrook, all of Ill.

[73] Assignee: International Harvester Co., Chicago, Ill.

[21] Appl. No.: 306,022

[22] Filed: Sep. 28, 1981

[51] Int. Cl.³ .................. B60K 41/26; G05G 11/00
[52] U.S. Cl. .................. 192/4 A; 74/483 K
[58] Field of Search ............ 192/4 A, 4 R; 74/483 R, 74/477, 483 K, 878

[56] References Cited

U.S. PATENT DOCUMENTS 2,716,474 8/1955 Panish .................. 74/483
2,771,168 11/1956 Panish .................. 74/483

Primary Examiner—George H. Krizmanich
Assistant Examiner—Mark Manley
Attorney, Agent, or Firm—Boris Parad; F. David Au Buchon

[57] ABSTRACT

A park lock interlock control system preventing the shifting of the vehicle transmission in gear positions when the drive train park lock is engaged. A two part interlock system comprises a park lock control including a crossover shaft and a transmission shift lever connected with a plate having a slot. The shaft projecting through the slot is able to rotate, thereby engaging or disengaging the drive train park lock, only when the shift lever is put in a neutral position, thus preventing an accidental transmission engagement in gear when the park lock is actuated.

5 Claims, 4 Drawing Figures

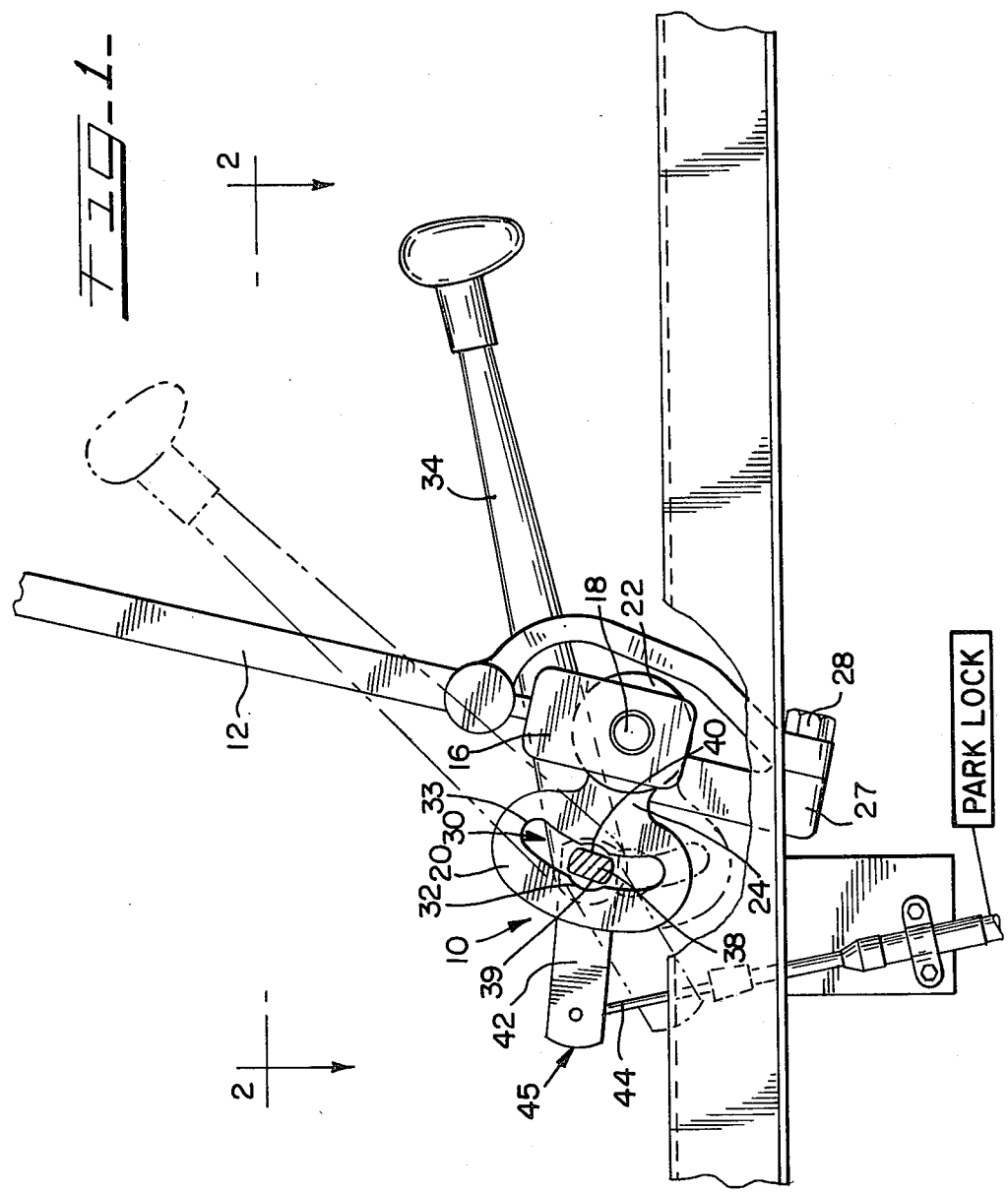

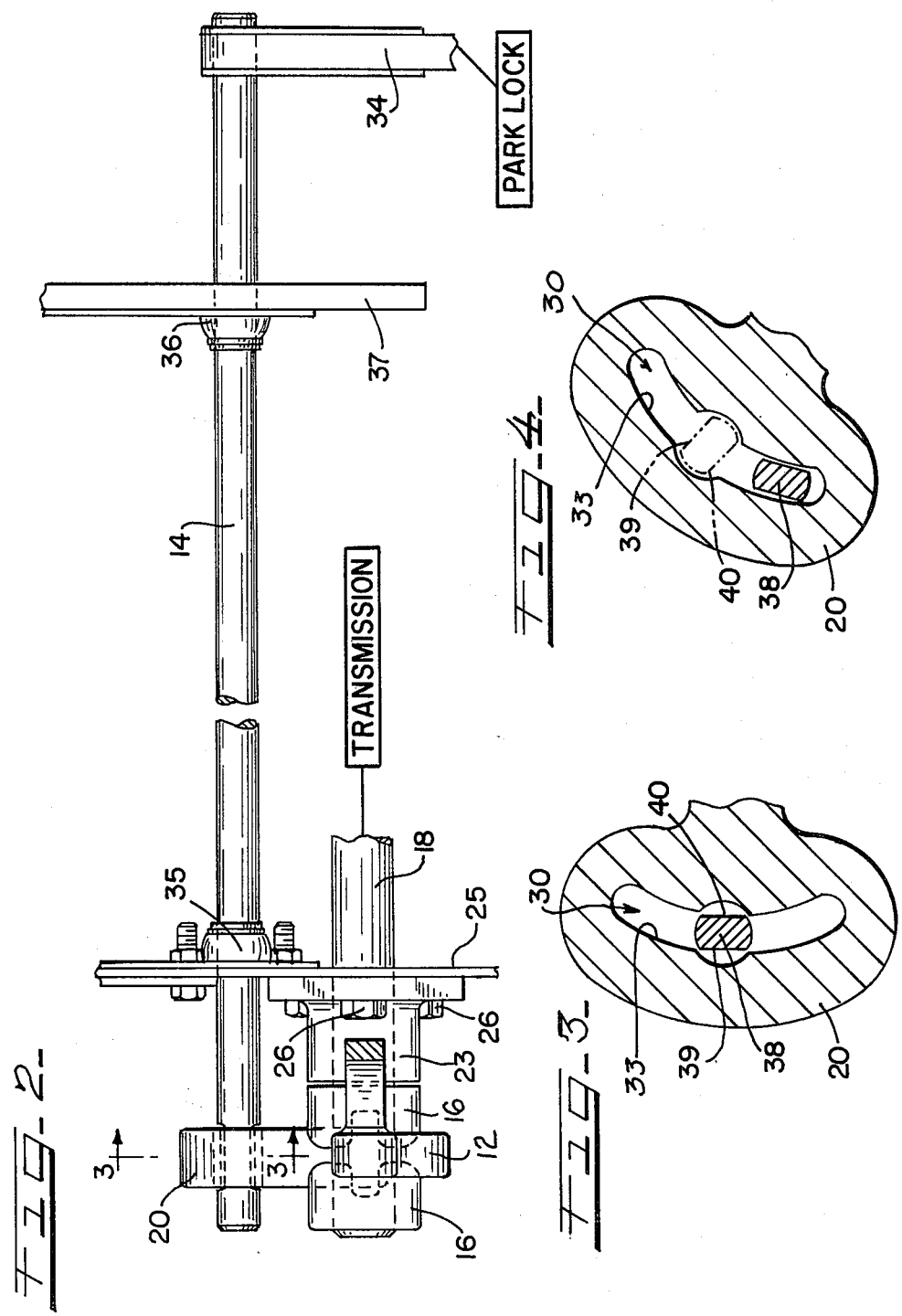

PARK LOCK INTERLOCK CONTROL SYSTEM

BACKGROUND OF THE INVENTION

1. Field of the Invention

This invention pertains to park lock interlock systems and more particularly to a tractor interlock system preventing the range transmission shifting in gear when the park lock is engaged.

2. Description of the Prior Art

Heretofore, numerous park lock interlock systems have been disclosed and some of which are exemplified in the following patents. For instance, the U.S. Pat. No. 3,987,878, discloses a range shift and park lock control on a tractor whereby a single lever is used to operate both functions.

Another U.S. Pat. No. 4,069,900, discloses a combination transmission neutralizer and power train interlock system including a mechanism which is actutable to engage an interlock with the power train to positively prevent movement of the vehicle.

Still another U.S. Pat. No. 3,987,879, discloses a vehicle park lock mechanism on a multiple shift transmission with the park lock and reverse operated on the same shift rail.

However, none of the prior art references of record discloses such a novel park lock interlock system as specified and described in the subject invention.

SUMMARY OF THE INVENTION

According to the invention, a park lock interlock control system for engagement and disengagement of a park lock in a vehicle drive train having a range shift transmission. The system comprises a transmission shift lever reciprocably movable between a plurality of gear positions and controlling the transmission. The gear positions include a neutral position. The transmission shift lever is connected with a transmission pivot shaft. A range shift plate is integrally attached to the transmission shift lever and movable therewith. This plate has a slot. A park lock lever is disposed in the vicinity of the transmission shift lever and rigidly secured to a park lock crossover shaft which extends transversely thereto and also interconnected with the park lock. The crossover shaft includes a finger projecting through the plate slot. The finger has guiding means permitting the plate to reciprocably and slidably move across the finger. The plate slot is shaped in such a way so as to impede the rotational movement of the finger therewithin. The plate slot has an enlarged section wherein the finger is able to rotate thereby actuating the park lock for immobilization of the vehicle drive train.

BRIEF DESCRIPTION OF THE DRAWINGS

FIG. 1 is an elevational fragmentary side view iof the park lock interlock control system;

FIG. 2 is a cross-sectional view taken substantially along the line 2—2 of FIG. 1;

FIG. 3 is a cross-sectional enlarged view taken substantially along the line 3—3 of FIG. 2 and showing the transmission shift lever in a neutral gear position;

FIG. 4 is a cross-sectional view taken substantially along the line 3—3 of FIG. 2 and showing the transmission shift lever in a gear position.

DESCRIPTION OF THE PREFERRED EMBODIMENT

Referring now to the drawings wherein reference characters designate like or corresponding parts throughout the several views, there is shown in FIG. 1 a park interlock control system 10. The interlock control system 10 prevents inadvertent shifting of the transmission gear shift lever 12 out of a neutral position and into gear until the interlock mechanism 10 is released and the park lock immobilizing the tractor drive train is disengaged. The tractor, or the like vehicle, interlock system 10 consists essentially of two parts, a transmission shift lever 12 and a park lock crossover shaft 14. The transmission shift lever 12 is reciprocably movable between a plurality of gear positions including a neutral position and controlling the range transmission. The shift lever 12 disposed in a vehicle operator cabin engages hubs 16 which are mounted on a transmission pivot shaft 18. A range shift plate 20 having an essentially oval configuration is attached to a range transmission shift collar 22 at the neck 24. The collar 22 is slidably mounted on the transmission pivot shaft 18. The support journal 23 is rigidly attached to a first console wall 25 by bolts or similar mechanical means 26, as shown in FIG. 2. The range shift plate 20 has a leg 27 which is rigidly secured to the transmission shift lever 12 by a shoulder bolt 28, which permits the lever 12 to pivot thereabout, or any other suitable means. The range shift plate 20 as an arcuate slot 30 which has an enlarged center section 32 comprising a full diameter opening and a narrow portion 33.

A park lock crossover shaft 14 has a park lock lever 34 extending transversely and rigidly secured thereto. The crossover shaft 14 is supported by bearing assemblies 35 and 36, which are integrally secured to the first and second console wall 25 and 37, respectively. The crossover shaft 14 has a finger 38 projecting through the plate slot 30. The finger 38 has guiding means comprising a diametrically opposed flat sides 39 and 40 which permit the plate 20 to reciprocably and slidably move across the finger 38. As shown only in FIG. 1, a link 42 is integrally attached to the crossover shaft 14 and also pivotally interconnected with a cable 44 connected with the park lock (not shown) in the vehicle drive train. The engagement means 45 comprising link 42 and cable 44 actuate the park lock upon the rotational movement of the crossover shaft 14.

In operation, when the range shift lever 12 is in a neutral position, not in gear, the range shift plate 20 aligns a full diameter opening 30 with the finger 38 on the park lock crossover shaft 14. This allows the park lock crossover shaft 14 to rotate, engaging or disengaging the park lock mechanism in the drive train through the engaging means 45. The park lock interlock plate 20 prohibits operation of the park lock lever 34 when the transmission shift lever 12 is in gear. This is accomplished by trapping the flats 39,40 of the finger 38, on the end of the park lock crossover shaft 14, in the narrow portion 33 of the interlock plate slot 30.

The transmission shift lever 12 can be put in gear only when the park lock lever 34 is disposed in such a way so the transmission shift plate 20 may reciprocably slide across the finger 38 within the slot narrow portion 33. Only when the finger 38 is disposed within the enlarged center section 32, which is correspondent to the transmission shift lever position in the neutral gear, the park lock lever 34 can rotate the crossover shaft 14. The shaft 14 rotation actuates the park lock which in turn, immobilizes the vehicle drive train. Conversely, it is impossible to put the transmission in gear without releasing the park lock from its engaged position, as shown in FIG. 4. When the park lock lever 34 is put in the disengaged position the finger 38 has its two flat sides 39,40 aligned with the configuration of the arcuate slot narrow portion 33, as shown in FIG. 3, thereby permitting the transmission shift lever 12 to move across the finger 38 and engage the transmission gear.

The system will engage or disengage the park lock and not allow the tractor or any other vehicle to be put in gear when the park lock is engaged. The park lock interlock control system requires no adjustment. It consists basically of two parts: the range transmission control and the park lock control. This simple structure facilitates assembly and makes it relatively less complex and costly than heretofore used interrelated power train interlock and transmission gear shift lever systems. The advantage of the present invention also includes adaptability to remotely dispose interlock.

This interlocking mechanism prevents operation of the vehicle in either forward or reverse when the park lock is applied.

The foregoing description and drawings merely illustrate the invention and the invention is not limited thereto, except insofar as the appended claims are so limited, and to those skilled in the art who have the disclosure before them will be able to make modifications and variations therein without departing from the scope of the invention.

What is claimed is:

1. A park lock interlock control system for engagement and disengagement of a park lock in a vehicle drive train having a range shift transmission, the system comprising:
    a transmission shift lever reciprocably movable between a plurality of gear positions and controlling said transmission, said gear positions including a neutral position;
    said transmission shift lever connected with a transmission pivot shaft;
    a range shift plate integrally attached to said transmission shift lever and movable therewith;
    said plate having a slot means;
    a park lock lever disposed in the vicinity of said transmission shift lever and rigidly secured to a park lock crossover shaft extending transversely thereto and interconnected with said park lock;
    said crossover shaft including a finger projecting through said plate slot means;
    said finger having guiding means permitting said plate to reciprocably and slidably move across said finger;
    said plate means automatically impeding the rotational movement of said finger therewithin;
    said plate slot means having an enlarged section wherein said finger being able to rotate, thereby actuating said park lock for immobilization of the vehicle drive train.

2. The system according to claim 1, and said finger positioned within said enlarged section being correspondent with said neutral position.

3. The system according to claim 1, and said slot means having an arcuate configuration with said enlarged section positioned in the center portion thereof.

4. The system according to claim 1, and said guiding means comprising diametrically opposed flat sides of said finger.

5. The system according to claim 1, and engagement means comprising a link means rigidly attached to and movable with said crossover shaft; said finger being formed by limitedly flattening two diametrically opposed sides of said crossover shafts; and said finger location along said crossover shaft being aligned with said plate.

* * * * *